US012211458B2

(12) United States Patent
Wang et al.

(10) Patent No.: US 12,211,458 B2
(45) Date of Patent: Jan. 28, 2025

(54) DISPLAY DEVICE AND METHOD FOR ADJUSTING VIEWING ANGLE THEREOF

(71) Applicant: HKC CORPORATION LIMITED, Shenzhen (CN)

(72) Inventors: Hongsong Wang, Shenzhen (CN); Miao Geng, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/227,335

(22) Filed: Jul. 28, 2023

(65) Prior Publication Data

US 2024/0296803 A1 Sep. 5, 2024

(30) Foreign Application Priority Data

Mar. 2, 2023 (CN) ......................... 202310192383.6

(51) Int. Cl.
*G09G 3/34* (2006.01)
*G09G 3/32* (2016.01)

(52) U.S. Cl.
CPC ............. *G09G 3/3426* (2013.01); *G09G 3/32* (2013.01); *G09G 2320/028* (2013.01)

(58) Field of Classification Search
CPC ... G09G 3/3426; G09G 3/32; G09G 2320/028
See application file for complete search history.

(56) References Cited

U.S. PATENT DOCUMENTS

2019/0353943 A1* 11/2019 Smith ............... G02F 1/133528

FOREIGN PATENT DOCUMENTS

| | | | |
|---|---|---|---|
| CN | 102913816 | A | 2/2013 |
| CN | 206557507 | U | * 10/2017 |
| KR | 20070108712 | 4 | 11/2017 |
| WO | 2021184644 | A1 | 9/2021 |

* cited by examiner

*Primary Examiner* — Robert J Michaud

(57) ABSTRACT

A display device and a method for adjusting a viewing angle thereof are disclosed. The display device includes a display panel and a direct-lit backlight module. The direct-lit backlight module includes a backplate disposed opposite to the display panel, at least one first rotating assembly fixed to a side of the backplate facing the display panel, at least one light source assembly disposed between the backplate and the display panel and connected to the at least one first rotating assembly, and a first rotation control center. The first rotating assembly controls the light source assembly to rotate and tilt relative to the display panel thus adjusting an angle between a light emitting surface of the light source assembly and the display panel. The first rotation control center is connected to the first rotating assembly to control the operation of the first rotating assembly.

18 Claims, 5 Drawing Sheets

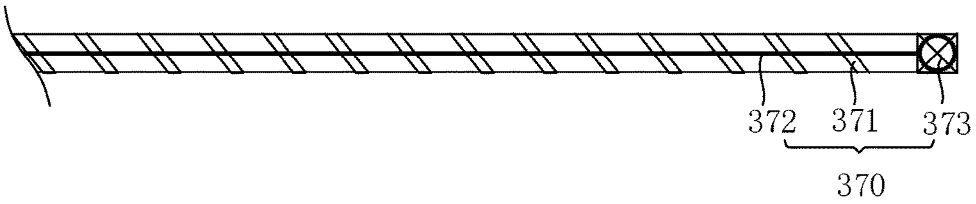

FIG. 9

Manipulating the first rotation control center and entering a command to reduce the viewing angle — S11

↓

Controlling the first stepper motors corresponding to the first light source assembly and the second light source assembly to move towards each other, so that the opposite ends of the first light source assembly and the second light source assembly that face each other are raised synchronously — S21

↓

Controlling the light supplementation assembly to emit light, and controlling the second stepper motor to move, so that the hydraulic assembly drives the light supplementation assembly to rise — S22

FIG. 10

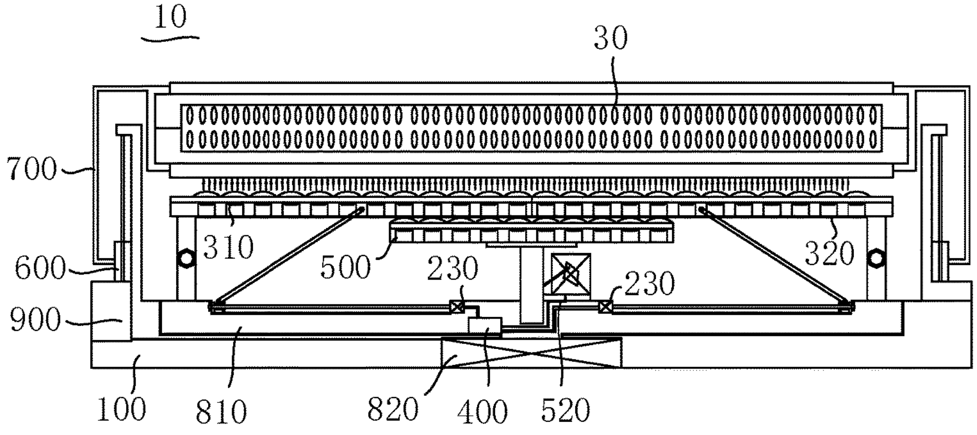

FIG. 11

DISPLAY DEVICE AND METHOD FOR ADJUSTING VIEWING ANGLE THEREOF

CROSS-REFERENCE TO RELATED APPLICATIONS

This application claims the priority and benefit of Chinese patent application number 2023101923836, titled "Display Device and Method for Adjusting Viewing Angle Thereof" and filed Mar. 2, 2023 with China National Intellectual Property Administration, the entire contents of which are incorporated herein by reference.

TECHNICAL FIELD

The present application relates to the field of display technology, and more particularly relates to a display device and a method for adjusting a viewing angle thereof.

BACKGROUND

The description provided in this section is intended for the mere purpose of providing background information related to the present application but doesn't necessarily constitute prior art.

With the rapid development of display technology, among direct-lit backlight display devices, the mini-LED backlight display device is gradually favored by more and more consumers due to its excellent characteristics of ultra-thin screen thickness, high contrast and high vividness, and has become a new display technology.

Since the display needs to protect personal privacy when used in some public places, it needs to have an adjustable viewing angle function. For direct-lit backlight display devices and mini-LED display devices, it is very difficult to achieve precise control of the viewing angle, and this problem needs to be solved urgently for the display industry.

SUMMARY

In view of the above, it is accordingly a purpose of the present application to provide a display device and a method for adjusting a viewing angle thereof, which can precisely adjust the viewing angle of the display device.

The application discloses a display device. The display device includes a display panel and a direct-lit backlight module. The display panel is arranged on the direct-lit backlight module, and a lower polarizer in the display panel faces the direct-lit backlight module. The direct-lit backlight module includes a backplate, at least one first rotating assembly, at least one light source assembly and a first rotation control center. The backplate is arranged opposite to the display panel. The first rotating assembly is arranged on the side of the backplate facing the display panel. The light source assembly is located between the backplate and the display panel, and is connected to the first rotating assembly. The first rotating assembly controls the light source assembly to rotate and tilt relative to the display panel, and adjusts the angle between a light emitting surface of the light source assembly and the display panel. The first rotation control center is connected with the first rotating assembly to control the operation of the first rotating assembly.

In some embodiments, the first rotating assembly includes a rotary connector, a threaded rod, a first stepper motor, a threaded nut and a support rod. The rotary connector is disposed on the side of the backplate facing the display panel. One end of the rotary connector is connected to one end of the light source assembly, and the other end is directly or indirectly connected to the backplate. The light source assembly is rotatably connected to the backplate through the rotary connector. The threaded rod is arranged on the backplate. An orthographic projection of the threaded rod on the backplate is covered by an orthographic projection of the light source assembly on the backplate. An extending direction of the threaded rod lies in a central axis plane defined in conjunction by the rotary connector and a central axis of the display panel.

The first stepper motor is arranged on the backplate and is disposed on the side of the threaded rod facing away from the rotary connector. The first stepper motor is connected with each of the first rotation control center and the threaded rod. The first rotation control center controls the first stepper motor to rotate. The first stepper motor controls the threaded rod to rotate. The threaded nut is mated with the threaded rod and slides along an extending direction of the threaded rod. One end of the support rod is connected with the threaded nut, and the other end is connected with the light source assembly.

In some embodiments, the direct-lit backlight module includes a first light source assembly and a second light source assembly. The first light source assembly and the second light source assembly are arranged side by side on both sides of the backlight module respectively. The direct-lit backlight module includes two first rotating assemblies. The two first rotating assemblies are respectively arranged corresponding to the first light source assembly and the second light source assembly. The first rotation control center controls the two first rotation assemblies to operate synchronously.

In some embodiments, the direct-lit backlight module further includes a light supplementation assembly. The light supplementation assembly is arranged parallel to the display panel, and the light supplementation assembly is arranged between the first light source assembly and the backplate. An orthographic projection of a gap between the first light source assembly and the second light source assembly on the backplate coincides with or is covered by an orthographic projection of the light supplementation assembly on the backplate.

In some embodiments, the direct-lit backlight module further includes a hydraulic assembly and a second stepper motor. The second stepper motor and the hydraulic assembly are arranged on the backplate. The second stepper motor is connected with each of the first rotation control center and the hydraulic assembly. The first rotation control center controls the push rod of the hydraulic assembly to rise through the second stepper motor. The light supplementation assembly is connected with the push rod of the hydraulic assembly.

In some embodiments, the direct-lit backlight module further includes a second rotating assembly and a second rotation control center. The second rotating assembly includes a rotary disc and a third stepper motor. The rotary disc is arranged on the side of the backplate facing the display panel, and is rotatably connected with the backplate. The first rotating assembly, the light source assembly, the light supplementation assembly, the hydraulic assembly and the second stepper motor are all arranged on the rotary disc. The third stepper motor is fixed onto the backplate, and the third stepper motor is connected to each of the rotary disc and the second rotation control center. The second rotation control center controls the rotary disc to rotate parallel to the plane where the display panel is located through the third stepper motor. A fixing hole is defined in the center of the rotary disc, and one end of the hydraulic assembly is arranged in the fixing hole.

In some embodiments, the direct-lit backlight module further includes a linear motor and a housing. The linear motor is vertically connected to the backplate, and is located between the first rotating assembly and an edge of the backplate. The housing is arranged around the display panel and the light source assembly. One end of the housing is connected to the linear motor, and the other end is connected to the display panel. The linear motor is connected to the first rotation control center. The first rotation control center controls the linear motor to operate, so that the housing and the display panel are moved along a direction perpendicular to the backplate.

In some embodiments, the light source assembly includes a light board, a mini-LED array, a quantum dot film, and a light manipulation structure. Along the direction towards the display panel, the light board, the mini-LED light bead array, the quantum dot film and the light manipulation structure are stacked in sequence. The light manipulation structure is used to process the light emitted by the mini-LED light bead array into parallel light.

The light source assembly further includes a light reflector, and the light reflector is arranged on the side of the light board facing away from the mini-LED array. The light reflector is used to reflect the light irradiated by the light supplementation assembly to the backs of the first light source assembly and the second light source assembly.

In some embodiments, the light reflector includes a transmission rope, a light manipulation motor and a plurality of light reflectors. The plurality of reflective sheets are arranged side by side. The transmission rope passes through the plurality of reflective sheets in sequence. The light manipulation motor is connected with the transmission rope to control the angle of the light reflector. The light manipulation motor communicates with the first rotation control center.

The present application further discloses a method for adjusting a viewing angle of a display device, which is used to adjust the viewing angle of the above-mentioned display device, including steps:

- manipulating the first rotation control center, and inputting a command to adjust the viewing angle; and
- controlling the rotation of the light source assembly through the first rotating assembly, and adjusting the angle between a light emitting surface of the light source assembly and the display panel, so as to adjust the viewing angle of the display device.

Compared with the current solution of controlling the width of the viewing angle of the display device through a dimming cell and a display liquid crystal cell, the present application adjusts the viewing angle of the display device by controlling and adjusting the angle from the light emitting surface of the light source assembly in the direct-lit backlight module to the display panel. In this application, the tilt angle of the light source assembly can be adjusted step by step through the first rotating assembly, and the light angle of the light source can be precisely controlled, so the purpose of precisely controlling the viewing angle of the display device can be achieved. Compared with the current solution, the technical solution of this application does not need to add the cost of expensive components such as the liquid crystal cell and the display liquid crystal cell, and only needs to add a simple mechanical structure and circuit structure inside the backlight module so as to realize viewing angle control. Therefore, the operation is simpler and the cost is lower, which is conducive to improving market competitiveness.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

FIG. 9 is a schematic diagram of a light reflector provided in the second embodiment of the present application.

FIG. 10 is a flow chart of a method for adjusting a viewing angle of the display device provided in the second embodiment of the present application.

FIG. 11 is a schematic diagram of a display device provided in a third embodiment of the present application when it is in a first state.

Figure 1:
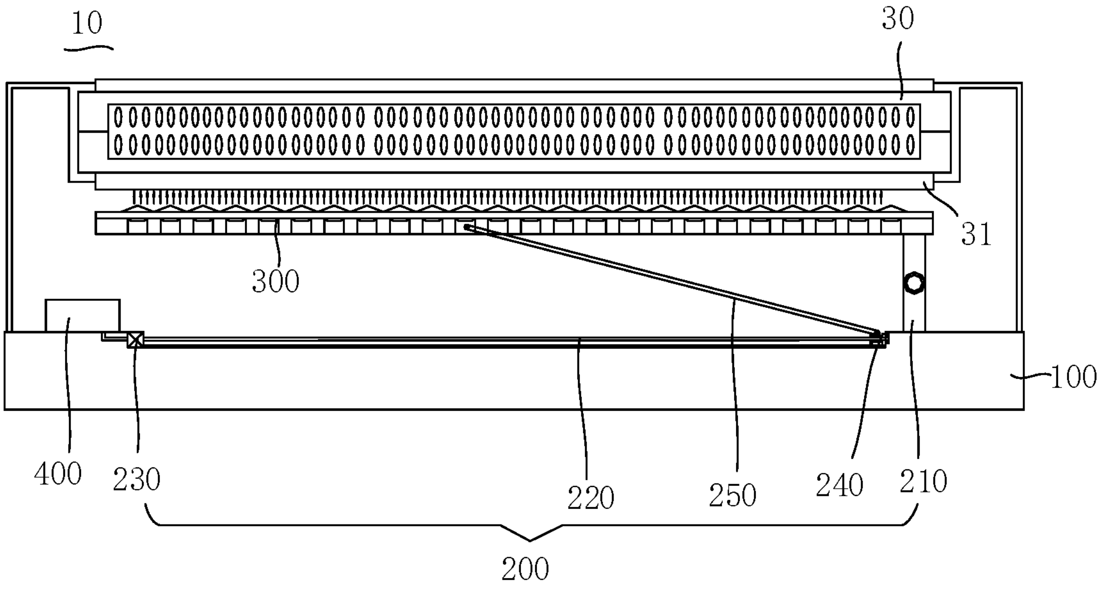
FIG. 1 is a schematic diagram of a display device provided in a first embodiment of the present application when it is in a first state.

In the drawings: 10, display device; 20, direct-lit backlight module; 30, display panel; 31, lower polarizer; 100, backplate; 200, first rotating assembly; 210, rotary connector; 220, threaded rod; 230, first stepper motor; 240, threaded nut; 241, main body; 242, threaded hole; 243, extension; 250, support rod; 300, light source assembly; 310, first light source assembly; 320, second light source assembly; 330, light board; 340, mini-LED light bead array; 350, quantum dot film; 360, light manipulation structure; 370, light reflector; 371, reflective sheet; 372, transmission rope; 373, light manipulation motor; 400, first rotation control center; 500, light supplementation assembly; 510, hydraulic assembly; 520, second stepper motor; 600, linear motor; 700, housing; 800, second rotating assembly; 812, disc body; 813, fixing hole; 820, third stepper motor; 900, second rotation control center.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Hereinafter this application will be described in further detail with reference to the accompanying drawings and some optional embodiments.

Figure 2:
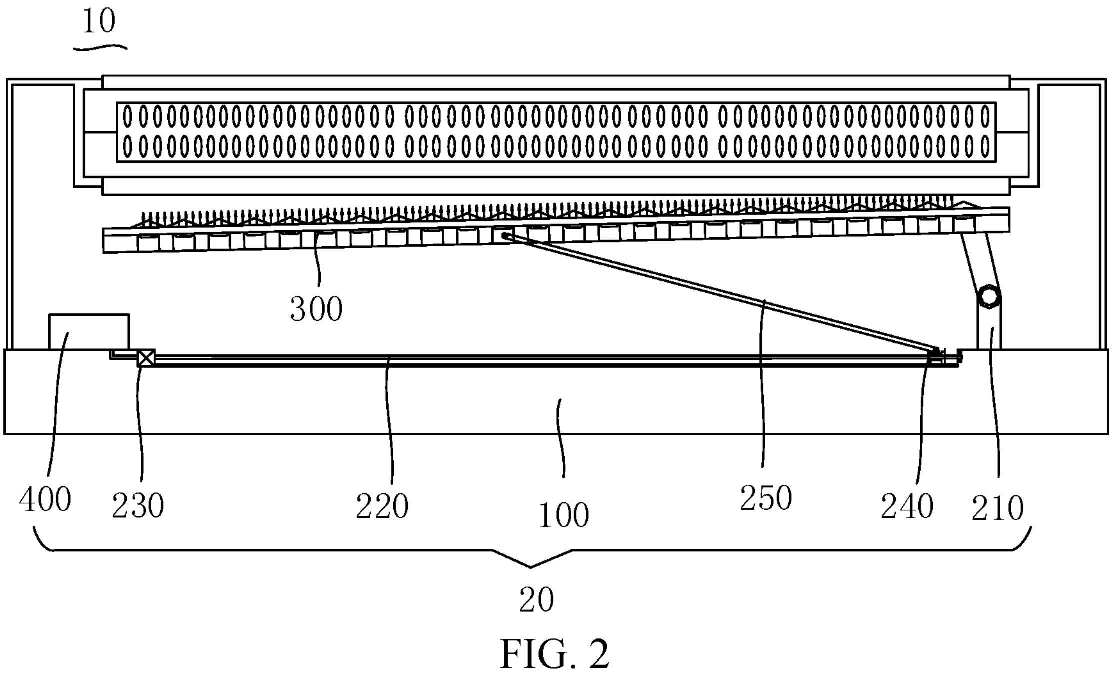
FIG. 2 is a schematic diagram of the display device provided in the first embodiment of the present application when it is in a second state.

As shown in FIG. 1 and FIG. 2, a first embodiment of the present application provides a display device. The display device 10 includes a display panel 30 and a direct-lit backlight module 20. The display panel 30 is arranged on the direct-lit backlight module 20, and a lower polarizer 31 in the display panel 30 faces the direct-lit backlight module 20. The direct-lit backlight module 20 includes a backplate 100, at least one first rotating assembly 200, at least one light source assembly 300 and a first rotation control center 400. The backplate 100 is arranged opposite to the display panel 30. The first rotating assembly 200 is fixed onto the side of the backplate 100 facing the display panel 30. The light source assembly 300 is located between the backplate 100 and the display panel 30 and is connected to the first rotating assembly 200. The light source assembly 300 is controlled to rotate and tilt relative to the display panel 30 through the first rotating assembly 200 to adjust an angle between a light emitting surface of the light source assembly 300 and the display panel 30. The first rotation control center 400 is connected to the first rotating assembly 200 to control the operation of the first rotating assembly 200.

In this embodiment of the present application, the direct-lit backlight module 20 has only one first rotating assembly 200 and one light source assembly 300 as an example for illustration, but it does not necessarily mean that there is only one first rotating assembly 200 and one light source assembly 300 in the direct-lit backlight module 20. There may be multiple first rotating assemblies 200 in combination with one light source assembly 300, or one first rotating assembly 200 in combination with multiple light source assemblies 300, or multiple first rotating assemblies 200 in combination with multiple light source assemblies 300.

As shown in FIG. 1, the display device 10 in FIG. 1 is at the maximum viewing angle state. At this time, the light source assembly 300 is arranged parallel to the display panel 30, and the light emitted by the light source assembly 300 is vertically incident into the display panel 30. As shown in FIG. 2, the tilt angle of the light source assembly 300 is adjusted in FIG. 2, so that the light emitted by the light source assembly 300 is obliquely incident on the display panel 30. At this time, the incident light is decomposed by the lower polarizer 31, only the light vertically incident on the lower polarizer 31 can pass through the display panel 30, and the light in other angles is filtered out, so only part of the incident light can exit the display panel. Furthermore, as the light source assembly 300 tilts outward, the larger the angle between the light source assembly 300 and the display panel 30 is, the more light is filtered by the lower polarizer 31. Furthermore, only part of the light emitted by the outer light beads of the light source assembly 300 can irradiate the display panel, because some of the light will be blocked by the housing structures on both sides of the display device 10, and then screened by the lower polarizer 31. Further, after being screened by the lower polarizer 31, even less light passes through the display panel 30, so that the light along the circumference of the display device 10 becomes darker, resulting in a smaller viewing angle. It should be noted that the tilt angle of the light source assembly 300 in FIG. 2 is merely an example, and the tilt of the light source assembly 300 may also be controlled to assume other angles, which can be selected according to actual needs.

As for the way the user adjusts the viewing angle, it can be associated with the first rotation control center 400 through software programming, and the viewing angle adjustment options can be displayed on the display interface. When using the display product, the user can adjust the viewing angle on the display interface. Alternatively, a knob or button connected to the first rotation control center 400 may alternatively be disposed on the back or side of the display device 10, and the user can manipulate the tilt angle of the light source assembly 300 through the knob or button, thereby realizing adjustment of the viewing angle.

Compared with the current solution of controlling the width of the viewing angle of the display device 10 through a dimming cell and a display liquid crystal cell, the present application adjusts the viewing angle of the display device 10 by controlling and adjusting the angle from the light emitting surface of the light source assembly 300 in the direct-lit backlight module 20 to the display panel 30. In this application, the tilt angle of the light source assembly 300 can be adjusted step by step through the first rotating assembly 200, and the light angle of the light source can be precisely controlled, so the purpose of precisely controlling the viewing angle of the display device 10 can be achieved. Compared with the current solution, the technical solution of this application does not need to add the cost of expensive components or parts such as the liquid crystal cell and the display liquid crystal cell, and only needs to add a simple mechanical structure and circuit structure inside the backlight module so as to realize viewing angle control. Therefore, the operation is simpler and the cost is lower, which is conducive to improving market competitiveness.

In particular, as an optional implementation, the first rotating assembly 200 includes a rotary connector 210, a threaded rod 220, a first stepper motor 230, a threaded nut 240 and a support rod 250. The rotary connector 210 is disposed on the side of the backplate 100 facing the display panel 30. One end of the rotary connector 210 is connected to one end of the light source assembly 300, and the other end of the rotary connector 210 is directly fixedly connected to the backplate 100. The rotary connector 210 adopts a hinge structure. The light source assembly 300 is rotatably connected to the backplate 100 through the rotary connector 210.

The threaded rod 220 is arranged on the backplate 100. It can be disposed in a groove in the backplate 100, or it can be set directly on a surface of the backplate 100. An orthographic projection of the threaded rod 220 on the backplate 100 is covered by an orthographic projection of the light source assembly 300 on the backplate 100. An extending direction of the threaded rod 220 lies in a central axis plane defined in conjunction by the rotary connector 210 and a central axis of the display panel 30 (the central axis plane is a vertical plane passing through a centerline of the display panel 30). That is, one end of the threaded rod 220 faces toward an edge of the backplate 100, and the other end faces toward a center of the backplate 100.

The first stepper motor 230 is arranged on the backplate 100 and is disposed on the side of the threaded rod 220 facing away from the rotary connector 210. Of course, the first stepper motor 230 can also be arranged on the side of the threaded rod 220 adjacent to the rotary connector 210, where the specific arrangement can be designed according to the actual situation. The first stepper motor 230 is connected to each of the first rotation control center 400 and the threaded rod 220. The first rotation control center 400 controls the first stepper motor 230 to rotate. The first stepper motor 230 controls the threaded rod 220 to rotate.

Figure 3:
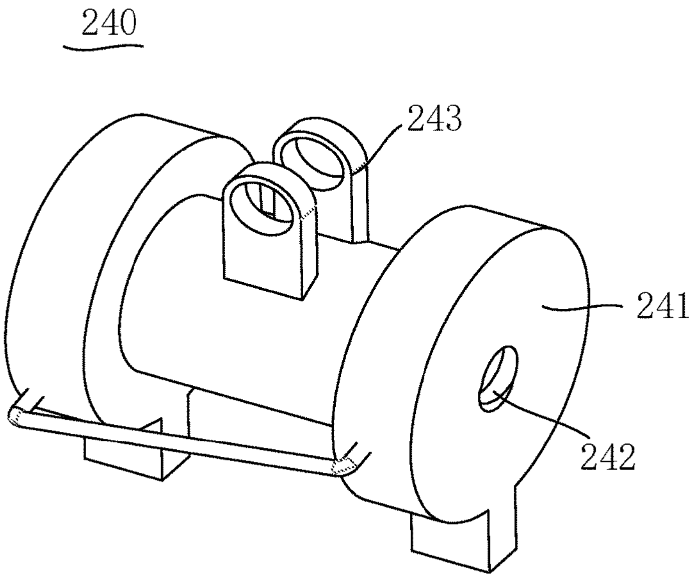
FIG. 3 is a schematic diagram of a threaded nut provided in the first embodiment of the present application.

As shown in FIG. 3, the threaded nut 240 includes a main body 241, which is suspended on or over the backplate 100. It should be noted that "suspended" here means that the main body 241 is not fixedly connected with the backplate 100, rather than that the main body 241 is not in contact with the backplate 100. The main body 241 defines a threaded hole 242 passing through the axis and matched with the threaded rod 220. When the threaded rod 220 rotates, the threaded nut 240 slides along the extending direction of the threaded rod 220.

One end of the support rod 250 is connected to the threaded nut 240, and the other end is connected to the light source assembly 300. In particular, the threaded nut 240 further includes two extensions 243. The two extensions 243 are disposed on the side of the main body 241 facing away from the backplate 100. One end of the support rod 250 is hinged to the two extensions 243. The other end of the support rod 250 is connected to the portion of the light source assembly 300 facing away from the rotary connector 210. In particular, it can be connected to the center of the light source assembly 300, or it can be connected to the end of the light source assembly 300 facing away from the rotary connector 210. The support rod 250 is rotatably connected to the light source assembly 300.

When the first stepper motor 230 is manipulated to move away from the rotary connector 210, one end of the light source assembly 300 rotates around the rotary connector 210, and the other end of the light source assembly 300 is pushed by the support rod 250, so that the light emitted by the light source assembly 300 is tilted to realize the adjustment of the viewing angle. To restore the normal viewing angle, it is only needed to manipulate the first stepper motor 230 to move in the direction of the rotary connector 210 so as to restore the initial position of the first stepper motor 230.

Figure 4:
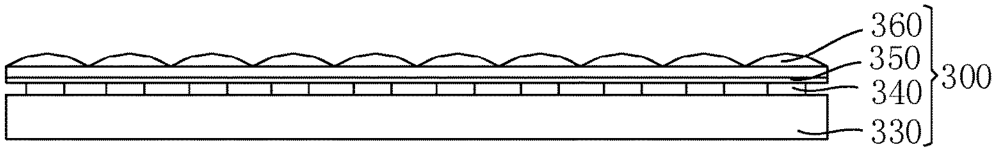
FIG. 4 is a schematic diagram of a light source assembly provided in the first embodiment of the present application.

As shown in FIG. 4, in this embodiment of the present application, the light source assembly 300 uses a mini-LED light source. The light source assembly 300 in particular includes a light board 330, a mini-LED light bead array 340, a quantum dot film 350 and a light manipulation structure 360. Along the direction toward the display panel 30, the light board 330, the mini-LED light bead array 340, the quantum dot film 350 and the light manipulation structure 360 are stacked in sequence. The quantum dot film 350 (QD) is used to adjust the blue light emitted by the mini-LED light bead array 340 into white light. The light manipulation structure 360 can adopt a convex lens structure, which is used to process the light emitted by the mini-LED light bead array 340 into parallel light, so as to improve light utilization efficiency.

Figure 5:
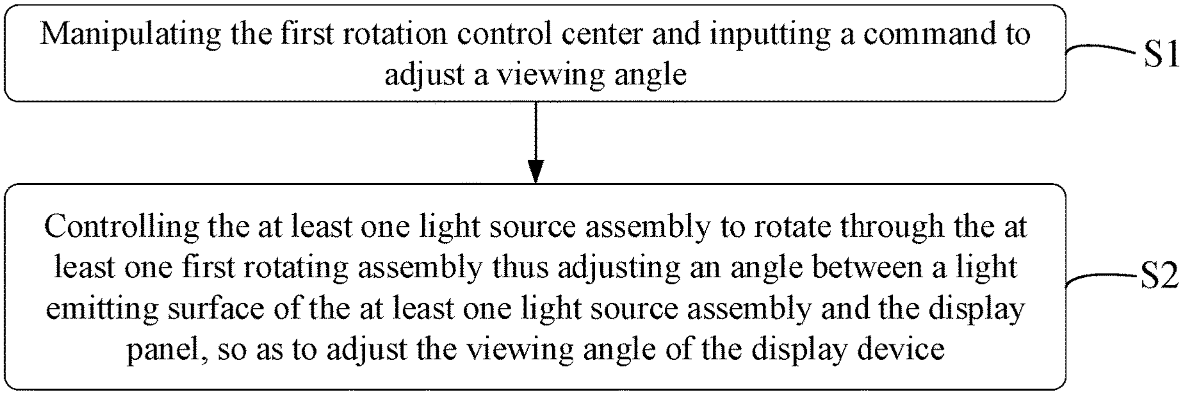
FIG. 5 is a flow chart of a method for adjusting a viewing angle of the display device provided in the first embodiment of the present application.

Correspondingly, as shown in FIG. 5, embodiments of the present application further discloses a corresponding viewing angle adjustment method for adjusting the viewing angle of the display device 10 as described above, including steps:

S1: manipulating the first rotation control center, and inputting a command to adjust the viewing angle;

S2: controlling the light source assembly to rotate through the first rotating assembly, adjusting the angle between a light emitting surface of the light source assembly and the display panel, so as to adjust the viewing angle of the display device.

In S1, the command to adjust the viewing angle can be a command to increase the viewing angle or a command to decrease the viewing angle. The command to adjust the viewing angle can be set through the display interface, or can be manipulated through keys or buttons disposed on the housing of the display device, which is not limited herein.

Figure 6:
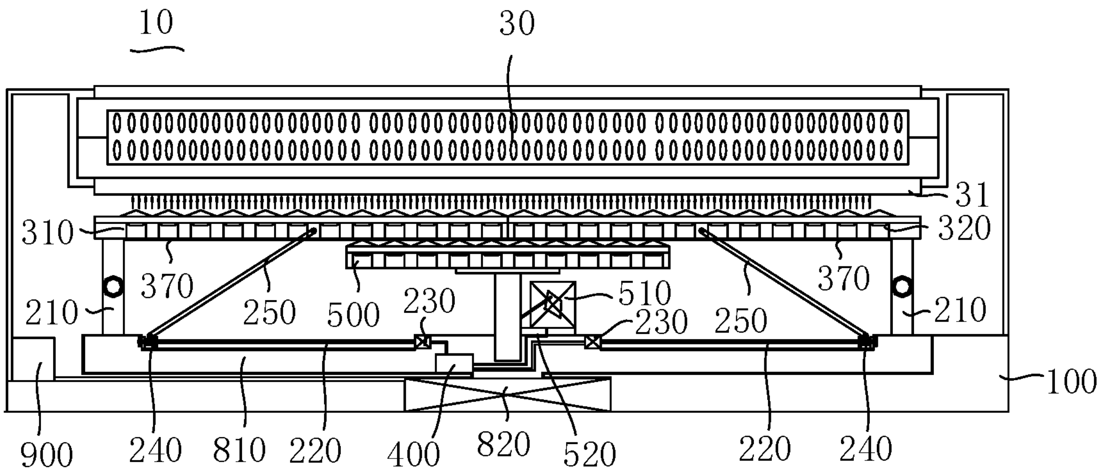
FIG. 6 is a schematic diagram of a display device provided in a second embodiment of the present application when it is in a first state.
Figure 7:
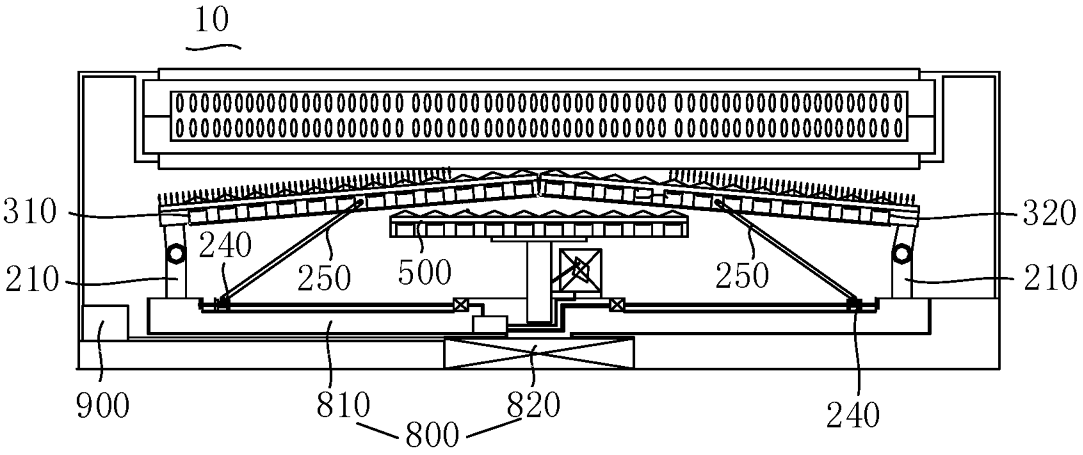
FIG. 7 is a schematic diagram of the display device provided in the second embodiment of the present application when it is in a second state.

As shown in FIG. 6 and FIG. 7, as a second embodiment provided by this application, this embodiment of this application provides another display device. As the second embodiment provided by this application, the difference from the first embodiment is that there are two light source assemblies 300 and two first rotating assemblies 200 in the direct-lit backlight module 20 in this embodiment of the application. In particular, the direct-lit backlight module 20 includes a first light source assembly 310 and a second light source assembly 320. The first light source assembly 310 and the second light source assembly 320 are arranged side by side respectively on both sides of the backlight module. The two first rotating assemblies 200 are arranged corresponding to the first light source assembly 310 and the second light source assembly 320 respectively. The first rotation control center 400 controls the two the first rotation assemblies 200 to operate synchronously, driving the first light source assembly 310 and the second light source assembly 320 to rotate synchronously thus approaching or leaving away from each other.

As an optional implementation of this embodiment, the direct-lit backlight module 20 may further include a light supplementation assembly 500. The light supplementation assembly 500 may also adopt the mini-LED design, and emits the same light as the first light source assembly 310 and the second light source assembly 320. The light supplementation assembly 500 is disposed parallel to the display panel 30, and is disposed between the first light source assembly 310 and the backplate 100. That is, the light supplementation assembly 500 is disposed under the first light source assembly 310 and the second light source assembly 320. An orthographic projection of the gap between the first light source assembly 310 and the second light source assembly 320 on the backplate 100 coincides with or is covered by an orthographic projection of the light supplementation assembly 500 on the backplate 100. The light supplementation assembly 500 can avoid the occurrence of dark regions between the first light source assembly 310 and the second light source assembly 320 when adjusting the viewing angle, and can also ensure the quantity of light and avoid the problem of dimming of the display brightness.

Furthermore, the direct-lit backlight module 20 further includes a hydraulic assembly 510 and a second stepper motor 520. The structures of the hydraulic assembly 510 and the second stepper motor 520 may adopt those of the general standard parts, which will not be described in detail herein. The second stepper motor 520 and the hydraulic assembly 510 are arranged on the backplate 100. The second stepper motor 520 is connected with each of the first rotation control center 400 and the hydraulic assembly 510. The first rotation control center 400 controls the hydraulic assembly 510 to rise through the second stepper motor 520. The light supplementation assembly 500 is connected with a push rod of the hydraulic assembly 510. The hydraulic assembly 510 controls the light supplementation assembly 500 to move along a direction perpendicular to the backplate 100.

As a further solution of this embodiment, the direct-lit backlight module 20 further includes a second rotating assembly 800 and a second rotation control center 900. The second rotating assembly 800 includes a rotary disc 810 and a third stepper motor 820. The rotary disc 810 is arranged on the side of the backplate 100 facing the display panel 30, and is rotatably connected with the backplate 100. The first rotating assembly 200, the first light source assembly 310, the second light source assembly 320, the light supplementation assembly 500, the hydraulic assembly 510 and the second stepper motor 520 are all arranged on the rotary disc 810. In this case, both the rotary connector 210 and the threaded rod 220 are directly fixed onto the rotary disc 810. The third stepper motor 820 is fixed onto the backplate 100. The third stepper motor 820 is connected to each of the rotary disc 810 and the second rotation control center 900. The second rotation control center 900 controls the rotary disc 810 to rotate parallel to the plane in which the display panel 30 is located through the third stepper motor 820.

In this embodiment, the rotary disc 810 controls the first light source assembly 310 and the second light source assembly 320 to rotate in a direction parallel to the plane of the display panel 30, so that the first light source assembly 310 and the second light source assembly 320 can not only be rotated to be side by side in a left and right orientation, but also can be rotated to be side by side in an up and down orientation, so the first light source assembly 310 and the second light source assembly 320 can be rotated and tilted in the left and right orientation, and can also be rotated and tilted in the up and down orientation, so that the viewing angle of the display device 10 in the left and right orientation can be adjusted, and the viewing angle of the display device 10 in the up and down orientation can also be adjusted, which can further improve the applicability and use effect of the display device 10.

Figure 8:
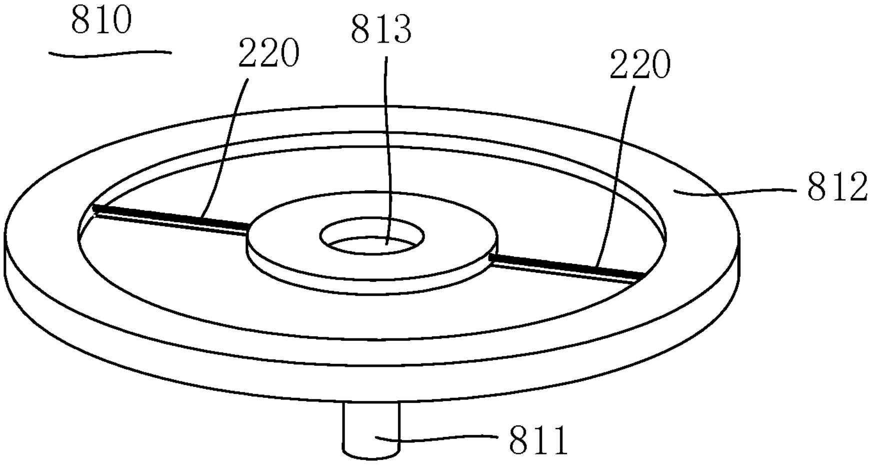
FIG. 8 is a schematic diagram of a turntable provided in the second embodiment of the present application.

In particular, the structure of the rotary disc 810 is shown in FIG. 8. The rotary disc 810 includes an insert base 811 and a disc body 812. The insert base 811 is located at the bottom of the disc body 812 and is rotatably connected with the backplate 100. The two threaded rods 220 corresponding to the first light source assembly 310 and the second light source assembly 320 are fixed side by side onto the disc body 812. The side of the disc body 812 facing away from the insert base 811 is provided with a fixing hole 813. The fixing hole 813 is disposed at a center of the rotary disc 810 and is located between the two threaded rods 220. A bottom of the hydraulic assembly 510 is disposed in the fixing hole 813.

In FIG. 6, the display device 10 is at an initial viewing angle. At this time, the first stepper motors 230 in the two first rotating assemblies 200 are in a state of the farthest distance, and the first light source assembly 310 and the second light source assembly 320 are parallel, maybe in the same plane, so that the first light source assembly 310 and the second light source assembly 320 are equidistant from the the display panel 30 is the same, and the light intensity is the same, so that the display brightness is uniform. Furthermore, at this time, the first light source assembly 310 and the second light source assembly 320 abuts against each other, so as to avoid a gap that may cause a dark line on the display.

When the display device 10 is displaying in the state shown in FIG. 6, the second stepper motor 520 is not activated, the hydraulic assembly 510 is in a retracted state, and the light supplementation assembly 500 does not emit light. At this time, only the first light source assembly 310 and the second light source assembly 320 emit light side by side, so as to avoid an increase in energy consumption.

In FIG. 7, the display device 10 is in the state after the viewing angle is reduced. At this time, the first stepper motors 230 in the two first rotating assemblies 200 move towards each other, so that the first light source assembly 310 and the second light source assembly 320 are pushed apart, and the included angle between the first light source assembly 310 and the second light source assembly 320 forms an acute angle. Furthermore, while the first stepper motor 230 is started, the first rotation control center 400 also controls the second stepper motor 520 to move, and further controls the light supplementation assembly 500 to emit light. The movement of the second stepper motor 520 enables the hydraulic assembly 510 to control the light supplementation assembly 500 to rise.

Since the first light source assembly 310 and the second light source assembly 320 are pushed apart, the light supplementation assembly 500 is exposed, and so controlling the light supplementation assembly 500 to rise can reduce the distance between the light supplementation assembly 500 and the display panel 30 thereby improving display brightness. At this time, the second rotation control center 900 can also control the rotary disc 810 to rotate to adjust the first light source assembly 310 and the second light source assembly 320 to the up and down positions to adjust the up and down viewing angle. The first rotation control center 400 and the second rotation control center 900 are driven independently, and both are controlled by the user independently.

Furthermore, the first rotation control center 400 simultaneously controls the movement or light emission of the first stepper motor 230, the second stepper motor 520, and the light supplementation assembly 500, so that the viewing angle adjustment process can be completed in a relatively short period of time, thus improving the user experience.

In addition, the light source assembly 300, that is, the first light source assembly 310 and the second light source assembly 320, further includes a light reflector 370 in addition to including the light board 330, the mini-LED light bead array 340, the quantum dot film 350 and the light manipulation structure 360. The light reflector 370 is arranged on the side of the light board 330 facing away from the mini-LED light bead array 340, and the light reflector 370 is used to reflect the light irradiated by the light supplementation assembly 500 to the backs of the first light source assembly 310 and the second light source assembly 320. After adding the light reflector 370, when the first light source assembly 310 and the second light source assembly 320 rotate to a large extent, resulting in no light or weak light in some parts of the lower polarizer in the display panel 30, or when most of the light emitted by the light supplementation assembly 500 is blocked by the first light source assembly 310 and the second light source assembly 320, the light reflector 370 can reflect the light blocked by the first light source assembly 310 and the second light source assembly 320 onto the display panel 30, thereby improving the light utilization efficiency, and the light reflector 370 can also supplement light to the relatively darker areas of the lower polarizer 31, thereby improving the display effect.

As an optional implementation, as shown in FIG. 9, the light reflector 370 includes a transmission rope 372, a light manipulation motor 373 and a plurality of reflective sheets 371. The plurality of light reflective sheets 371 are arranged side by side. The transmission rope 372 passes through the plurality of the reflective sheets 371 in sequence. The light manipulation motor 373 is connected to the transmission rope 372 to control the angle between the light reflective sheets 371 and the light board 330. The light manipulation motor 373 is connected with the first rotation control center 400. When the first rotation control center 400 controls the first stepper motor 230 and the second stepper motor 520, it also synchronously controls the light manipulation motor 373 so that the reflective sheets 371 can always maintain a proper angle. For the specific connection design of the transmission rope 372, the light manipulation motor 373 and the reflective sheet 371, one can refer to the structure of the shutter, which will not be detailed herein.

Compared with a general light reflector, since the first light source assembly 310 and the second light source assembly 320 can be adjusted to different angles, the fixed angle of reflection of the light reflector cannot make full use of the light emitted by the light supplementation assembly 500. With the light reflector 370 in the embodiments of the present application, the rotational angle of the light reflective sheets 371 can be adjusted at any time, and so the reflective surface of the light reflectors 370 can be adjusted, so that when the first light source assembly 310 and the second light source assembly 320 are adjusted to different angles, the maximum utilization rate of the light emitted by the light supplementation assembly 500 can also be maintained all along.

Correspondingly, as shown in FIG. 10, the embodiments of the present application further disclose a method for adjusting a viewing angle of a display device, which is used to adjust the viewing angle of the display device 10 in the embodiments of the present application. Taking reducing the viewing angle of the display device 10 as an example, the steps in particular include:

- S11: manipulating the first rotation control center, and inputting a command to reduce the viewing angle;
- S21: controlling the first stepper motors corresponding to the first light source assembly and the second light source assembly to move towards each other, so that the opposite ends of the first light source assembly and the second light source assembly that face each other are raised synchronously;
- S22: controlling the light supplementation assembly to emit light, and controlling the second stepper motor to move, so that the hydraulic assembly drives the light supplementation assembly to rise.

Figure 12:
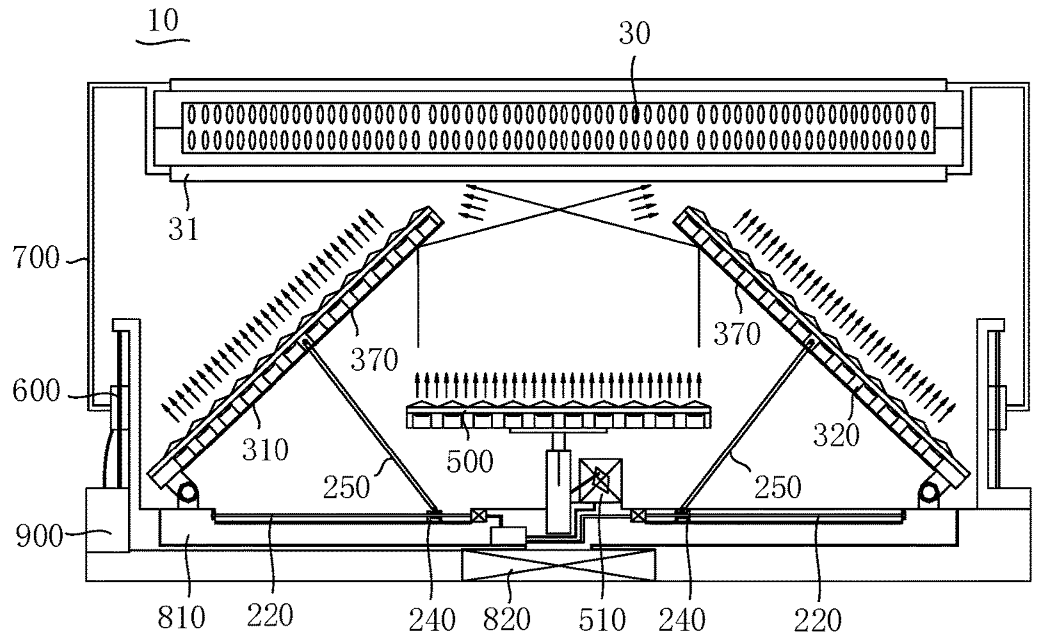
FIG. 12 is a schematic diagram of the display device provided in the third embodiment of the present application when it is in a second state.

As shown in FIG. 11 and FIG. 12, as a third embodiment provided by the present application, this embodiment of the present application provides another display device, the difference from the second embodiment is that this embodiment of the present application is that on the basis of the second embodiment, this embodiment of the present application additionally adds a linear motor 600 and a housing 700 in the direct-lit backlight module 20. The linear motor 600 is vertically connected to the backplate 100 and is located between the first rotating assembly 200 and an edge of the backplate 100. The housing 700 is arranged around the display panel 30 and the light source assembly 300. One end of the housing 700 is connected to the linear motor 600, and the other end is connected to the display panel 30. The linear motor 600 is connected to the first rotation control center 400. The first rotation control center 400 controls the linear motor 600 to operate thus moving the housing 700 and the display panel 30 in a direction perpendicular to the backplate 100 so that the housing 700 and the display panel 30 are moved along a direction perpendicular to the backplate 100.

In FIG. 11, the display device 10 is at an initial viewing angle. At this time, the first light source assembly 310 and the second light source assembly 320 are parallel, the linear motor 600 is not activated, the height of the display panel 30 is at the lowest state, and when the display device 10 displays, the light supplementation assembly 500 does not emit light.

In FIG. 12, the viewing angle of the display device 10 is reduced. At this time, the linear motor 600 is activated, driving the housing 700 and the display panel 30 to move upward, and so the first light source assembly 310 and the second light source assembly 320 are pushed apart, and the light supplementation assembly 500 rises and emits light.

In this embodiment, since the display panel 30 can rise during the process of reducing the viewing angle, the space between the display panel 30 and the backplate 100 is increased, and so the lifting degree of the first light source assembly 310 and the second light source assembly 320 becomes larger, further improving the adjustment range of viewing angle. Furthermore, the rising height of the light supplementation assembly 500 is also increased, which can provide a better supplementary light effect.

Figure 13:
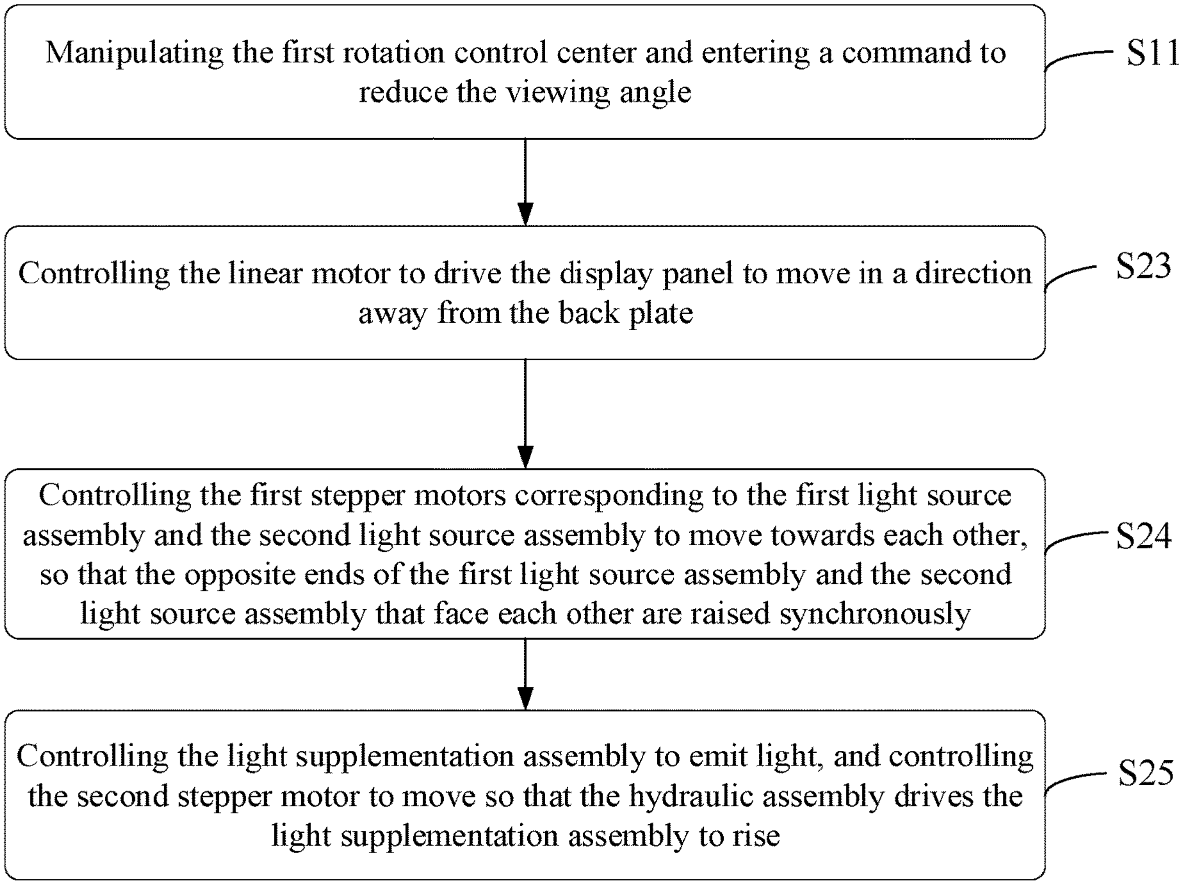
FIG. 13 is a flow chart of a method for adjusting a viewing angle of the display device provided in the third embodiment of the present application.

Correspondingly, as shown in FIG. 13, the embodiments of the present application further disclose a method for adjusting a viewing angle of a display device, which is used to adjust the viewing angle of the display device 10 in the embodiments of the present application. Taking reducing the viewing angle of the display device 10 as an example, the steps in particular include:

- S11: manipulating the first rotation control center, and inputting a command to reduce the viewing angle;
- S23: controlling the linear motor to drive the display panel to move in a direction away from the backplate;
- S24: controlling the first stepper motors corresponding to the first light source assembly and the second light source assembly to move towards each other, so that the opposite ends of the first light source assembly and the second light source assembly that face each other are raised synchronously;
- S25: controlling the light supplementation assembly to emit light, and controlling the second stepper motor to move, so that the hydraulic assembly drives the light supplementation assembly to rise.

It should be noted that the limitations of various operations involved in this solution will not be deemed to limit the order of the operations, provided that they do not affect the implementation of the specific solution, so that the operations written earlier may be executed earlier or they may also be executed later or even at the same time. The solutions of different embodiments can be combined and applied should no conflict occurs, and as long as the present solution can be implemented, they should all be regarded as falling in the scope of protection of this application.

In addition, the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display device, comprising a display panel and a direct-lit backlight module, wherein the display panel is arranged on the direct-lit backlight module, and wherein a lower polarizer in the display panel is disposed facing the direct-lit backlight module, wherein the direct-lit backlight module comprises:

a backplate, disposed opposite to the display panel;

at least one first rotating assembly, disposed on a side of the backplate facing the display panel;

at least one light source assembly, disposed between the backplate and the display panel and connected to the at least one first rotating assembly, wherein the at least one first rotating assembly is configured to control the at least one light source assembly to rotate and tilt relative to the display panel thus adjusting an angle between a light emitting surface of the at least one light source assembly and the display panel; and a first rotation control center, coupled to the at least one first rotating assembly and configured to control the at least one first rotating assembly to operate;

wherein the at least one first rotating assembly comprises:

a rotary connector, disposed on the side of the backplate facing the display panel, wherein one end of the rotary connector is connected to one end of the at least one light source assembly, and another end of the rotary connector is directly or indirectly connected to the backplate, wherein the at least one light source assembly is rotatably connected to the backplate through the rotary connector;

a threaded rod, disposed on the backplate, wherein an orthographic projection of the threaded rod on the backplate is covered by an orthographic projection of the at least one light source assembly on the backplate; and wherein an extending direction of the threaded rod lies in a central axis plane defined in conjunction by the rotary connector and a central axis of the display panel;

a first stepper motor, disposed on the backplate and on a side of the threaded rod facing away from the rotary connector; wherein the first stepper motor is connected to each of the first rotation control center and the threaded rod, wherein the first rotation control center is configured to control the first stepper motor to rotate, and the first stepper motor is operative to control the threaded rod to rotate;

a threaded nut, mated with the threaded rod and slidable along the extending direction of the threaded rod; and a support rod, wherein one end of the support rod is connected to the threaded nut, and the other end is connected to the light source assembly.

2. The display device as recited in claim 1, wherein the threaded nut comprises a main body suspended on or over the backplate, wherein there is defined inside the main body a threaded hole that runs through an axis of the main body and that is mated with the threaded rod, wherein when the threaded rod rotates, the threaded nut is operative to slide along the extending direction of the threaded rod.

3. The display device as recited in claim 2, wherein the threaded nut further comprises two extensions arranged on a side of the main body facing away from the backplate, wherein one end of the support rod is hingedly connected to the two extensions, and wherein another end of the support rod is connected to a portion of the at least one light source assembly facing away from the rotary connector.

4. The display device as recited in claim 1, wherein the direct-lit backlight module comprises a first light source assembly and a second light source assembly that are arranged side by side on both sides of the backlight module respectively;

wherein the direct-lit backlight module comprises two first rotating assemblies respectively arranged corresponding to the first light source assembly and the second light source assembly; and wherein the first rotation control center is configured to control the two first rotating assemblies to operate in tandem.

5. The display device as recited in claim 4, wherein the direct-lit backlight module further comprises a light supplementation assembly, which is disposed parallel to the display panel and disposed between the first and second light source assemblies and the backplate;

wherein an orthographic projection of a gap between the first light source assembly and the second light source assembly on the backplate coincides with or is covered by an orthographic projection of the light supplementation assembly on the backplate.

6. The display device as recited in claim 5, wherein the direct-lit backlight module further comprises a hydraulic assembly and a second stepper motor that are arranged on the backplate, wherein the second stepper motor is connected to each of the first rotation control center and the hydraulic assembly, and wherein the first rotation control center is configured to control a push rod of the hydraulic assembly to rise and fall through the second stepper motor, and wherein the light supplementation assembly is connected to the push rod of the hydraulic assembly.

7. The display device as recited in claim 6, wherein the direct-lit backlight module further comprises a second rotating assembly and a second rotation control center, the second rotating assembly comprising:

a rotary disc, arranged on the side of the backplate facing the display panel and rotatably connected to the backplate; wherein the two first rotating assemblies, the first and second light source assemblies, the light supplementation assembly, the hydraulic assembly, and the second stepper motor are all arranged on the rotary disc; and a third stepper motor, fixed onto the backplate and connected to each of the rotary disc and the second rotation control center, and wherein the second rotation control center is configured to control the rotary disc to rotate in a plane parallel to a plane where the display panel is located through the third stepper motor;

wherein a fixing hole is defined in a center of the rotary disc, and wherein one end of the hydraulic assembly is disposed in the fixing hole.

8. The display device as recited in claim 7, wherein the rotary disc comprises an insert base and a disc body, wherein the insert base is located at a bottom of the disc body and is rotatably connected to the backplate;

wherein the two threaded rods respectively corresponding to the first light source assembly and the second light source assembly are fixed side by side onto the disc body, and wherein the fixing hole is defined in a side of the disc body facing away from the insert base.

9. The display device as recited in claim 1, wherein the direct-lit backlight module further comprises:

a linear motor, vertically connected to the backplate and disposed between the at least one first rotating assembly and an edge of the backplate; and a housing, arranged around the display panel and the at least one light source assembly, wherein one end of the housing is connected to the linear motor, and another end of the housing is connected to the display panel;

wherein the linear motor is coupled to the first rotation control center, and wherein the first rotation control center is operative to control the linear motor to operate thus moving the housing and the display panel in a direction perpendicular to the backplate.

10. The display device as recited in claim 5, wherein the first light source assembly and the second light source assembly each comprise a light board, a mini-LED light bead array, a quantum dot film, and a light manipulation structure; wherein the light board, the mini-LED array, the quantum dot film, and the light manipulation structure are stacked in sequence along a direction toward the display panel; and wherein the light manipulation structure is used to process the light emitted by the mini-LED light bead array to obtain parallel light;

wherein the first light source assembly and the second light source assembly each further comprise a light reflector disposed on a side of the light board facing away from the mini-LED light bead array, wherein the light reflector is used to reflect the light that is emitted by the light supplementation assembly to backs of the first light source assembly and the second light source assembly.

11. The display device of claim 10, wherein the light reflector comprises:

a plurality of reflective sheets, which are arranged side by side;

a transmission rope, passing through the plurality of light reflectors in sequence;

wherein the light manipulation motor is connected to the transmission rope to control an angle of each reflective sheet, and wherein the light manipulation motor is coupled with the first rotation control center.

12. The display device as recited in claim 10, wherein the light manipulation structure adopts a convex lens structure.

13. The display device as recited in claim 4, wherein the direct-lit backlight module further comprises:

a linear motor vertically connected to the backplate and located between each first rotating assembly and an edge of the backplate arranged around the display panel and the first and second light source assemblies; and a housing, arranged around the display panel and the first and second light source assemblies, wherein one end of the housing is connected to the linear motor, and another end of the housing is connected to the display panel;

wherein the linear motor is connected to the first rotation control center, and wherein the first rotation control center is configured to control the linear motor to operate thus moving the housing and the display panel in a direction perpendicular to the backplate.

14. A display device, comprising a display panel and a direct-lit backlight module, wherein the display panel is arranged on the direct-lit backlight module, and wherein a lower polarizer in the display panel is disposed facing the direct-lit backlight module, wherein the direct-lit backlight module comprises:

a backplate, disposed opposite to the display panel;

two first rotating assemblies, disposed on a side of the backplate facing the display panel;

a first light source assembly and a second light source assembly, disposed between the backplate and the display panel and arranged side by side on both sides of the backlight module respectively, and connected to the two first rotating assemblies respectively, wherein the two first rotating assemblies are operative to respectively control the first light source assembly and the second light source assembly to rotate and tilt relative to the display panel thus adjusting an angle formed from a light emitting surface of each of the first light source assembly and the second light source assembly to the display panel;

a first rotation control center, connected to the two first rotation assemblies and configured to control the two first rotation assemblies to operate in tandem;

a light supplementation assembly, arranged parallel to the display panel and between the first and second light source assemblies and the backplate;

a linear motor, vertically connected to the backplate and located between each first rotating assembly and an edge of the backplate; and a housing, arranged around the display panel, the first light source assembly, and the second light source assembly; wherein one end of the housing is connected to the linear motor, and another end of the housing is connected to the display panel; wherein the linear motor is coupled with the first rotation control center, and wherein the first rotation control center is configured to control the linear motor to operate thus moving the housing and the display panel in a direction perpendicular to the backplate;

wherein each of the two first rotating assemblies comprises:

a rotary connector, disposed on the side of the backplate facing the display panel, wherein one end of the rotary connector is connected to one end of the respective first or second light source assembly, and another end of the rotary connector is directly or indirectly connected to the backplate, wherein the respective first or second light source assembly is rotatably connected to the backplate through the rotary connector;

a threaded rod, disposed on the backplate, wherein an orthographic projection of the threaded rod on the backplate is covered by an orthographic projection of the respective first or second light source assembly on the backplate; and wherein an extending direction of the threaded rod lies in a central axis plane defined in conjunction by the rotary connector and a central axis of the display panel;

a first stepper motor, disposed on the backplate and on a side of the threaded rod facing away from the rotary connector; wherein the first stepper motor is connected to the first rotation control center and the threaded rod, wherein the first rotation control center is configured to control the first stepper motor to rotate, and the first stepper motor is operative to control the threaded rod to rotate;

a threaded nut, mated with the threaded rod and slidable along the extending direction of the threaded rod; and a support rod, wherein one end of the support rod is connected to the threaded nut, and the other end is connected to the respective first or second light source assembly.

15. A method for adjusting a viewing angle of a display device, wherein the display device comprises a display panel and a direct-lit backlight module, wherein the display panel is arranged on the direct-lit backlight module, and wherein a lower polarizer in the display panel is disposed facing the direct-lit backlight module, wherein the direct-lit backlight module comprises: a backplate, disposed opposite to the display panel; at least one first rotating assembly, disposed on a side of the backplate facing the display panel; at least one light source assembly, disposed between the backplate and the display panel and connected to the at least one first rotating assembly, wherein the at least one first rotating assembly is configured to control the at least one light source assembly to rotate and tilt relative to the display panel thus adjusting an angle between a light emitting surface of the at least one light source assembly and the display panel; and a first rotation control center, coupled to the at least one first rotating assembly and configured to control the at least one first rotating assembly to operate; wherein the at least one first rotating assembly comprises: a rotary connector, disposed on the side of the backplate facing the display panel, wherein one end of the rotary connector is connected to one end of the at least one light source assembly, and another end of the rotary connector is directly or indirectly connected to the backplate, wherein the at least one light source assembly is rotatably connected to the backplate through the rotary connector; a threaded rod, disposed on the backplate, wherein an orthographic projection of the threaded rod on the backplate is covered by an orthographic projection of the at least one light source assembly on the backplate; and wherein an extending direction of the threaded rod lies in a central axis plane defined in conjunction by the rotary connector and a central axis of the display panel; a first stepper motor, disposed on the backplate and on a side of the threaded rod facing away from the rotary connector; wherein the first stepper motor is connected to each of the first rotation control center and the threaded rod, wherein the first rotation control center is configured to control the first stepper motor to rotate, and the first stepper motor is operative to control the threaded rod to rotate; a threaded nut, mated with the threaded rod and slidable along the extending direction of the threaded rod; and a support rod, wherein one end of the support rod is connected to the threaded nut, and the other end is connected to the light source assembly:

wherein the method comprises:

manipulating the first rotation control center and inputting a command to adjust the viewing angle; and controlling the at least one light source assembly to rotate through the at least one first rotating assembly thus adjusting an angle between a light emitting surface of the at least one light source assembly and the display panel, so as to adjust the viewing angle of the display device.

16. The method as recited in claim 15, wherein the command for adjusting the viewing angle comprises a viewing angle increase command and a viewing angle decrease command.

17. The method as recited in claim 16, wherein the command for adjusting the viewing angle is set through a display interface of the display device.

18. The method as recited in claim 16, wherein the command for adjusting the viewing angle is controlled by a button disposed on a housing of the display device.

* * * * *